(12) United States Patent
Williams et al.

(10) Patent No.: US 6,804,111 B1
(45) Date of Patent: Oct. 12, 2004

(54) LOCKING MECHANISM FOR DISK DRIVE CARRIER ENCLOSURE SYSTEM

(75) Inventors: Carl Duane Williams, Colorado Springs, CO (US); Grant Edward Carlson, Florissant, CO (US); John William McSweeney, Baldoyle (IE); Phillip John Bannister, Kilmainham (IE)

(73) Assignee: Eurologic Systems Limited, Dublin (IE)

( * ) Notice: Subject to any disclaimer, the term of this patent is extended or adjusted under 35 U.S.C. 154(b) by 272 days.

(21) Appl. No.: 10/080,417

(22) Filed: Feb. 22, 2002

Related U.S. Application Data

(60) Provisional application No. 60/270,940, filed on Feb. 22, 2001.

(51) Int. Cl.[7] .................................................. G06F 1/16
(52) U.S. Cl. ........................ 361/685; 361/684; 361/726; 361/732; 312/223.1; 312/223.2
(58) Field of Search ................................. 361/683, 685, 361/686, 788, 724–732; 312/223.1–223.3; 362/133, 559; 70/32–34, 14, 57, 58; 248/552, 553

(56) References Cited

U.S. PATENT DOCUMENTS

| | | | | |
|---|---|---|---|---|
| 6,129,440 A | * | 10/2000 | Reynolds ...................... | 362/95 |
| 6,424,523 B1 | * | 7/2002 | Curtis et al. ................. | 361/685 |
| 6,431,718 B1 | * | 8/2002 | Gamble et al. ............... | 362/85 |
| 6,483,107 B1 | * | 11/2002 | Rabinovitz et al. ......... | 250/239 |
| 2003/0201902 A1 | * | 10/2003 | Post et al. ............... | 340/693.5 |

* cited by examiner

Primary Examiner—Darren Schuberg
Assistant Examiner—Anthony Q. Edwards
(74) Attorney, Agent, or Firm—Oppedahl & Larson LLP

(57) ABSTRACT

In a disk drive enclosure system having carriers fitting into slots in the enclosure, each carrier has a lock mechanism. The lock mechanism has a part which rotates between locked and unlocked positions, and the part has a feature that blocks removal of the carrier when the part is in the locked position, while permitting removal of the carrier when the part is in the unlocked position. The part is plastic and is molded of a clear material serving as a light pipe. A light source is behind the part, so that the ability of light to pass through the part is affected by the locked/unlocked position of the part. The part has a shape feature that assists a user in distinguishing between locked and unlocked positions, and the light indicator further assists the user in this way. Valuable bezel space is saved, especially in comparison with some prior-art locking mechanisms.

10 Claims, 11 Drawing Sheets

LOCKING MECHANISM FOR DISK DRIVE CARRIER ENCLOSURE SYSTEM

This application claims priority from U.S. application Ser. No. 60/270,940, filed Feb. 22, 2001, which application is hereby incorporated herein by reference.

BACKGROUND

A variety of economic, social and technological changes in recent years have prompted intense interest in reliable and dense storage systems. The Internet requires companies to set up web and commerce servers which require storage systems. Editing and storage of media such as video call for large amounts of storage from which it is desired to retrieve arbitrary portions without undue delay. It is desirable for these systems to be rack-mountable in standardized 19-inch racks. These and other applications have led to the development of storage systems made up of large numbers of hard disk drives. In such a system it is desired that each drive be individually removable and replaceable. This generally leads to a system having an enclosure or shelf with a dozen or more slots into which disk drive carriers may slide. Each carrier has a bezel and handle assembly which is visible when the carrier has been inserted into the enclosure. The bezel serves a number of important functions, including providing a uniform appearance of the system when its slots are fully populated with carriers. The handle is used to assist in extraction of the carrier and to assist in insertion of the carrier.

Balanced against ease of removal and replacement, however, is the concern that a drive carrier should not be at risk of inadvertent removal, and that it should not be disposed to vibrate loose from its operating position. It is thus necessary to devise a locking system that locks each carrier into place except in the rare instances in which it is desired that a carrier be capable of being removed. Each carrier must be individually capable of being locked or unlocked, separately from any other carrier.

Yet another design constraint is that it is desired to fit as many drives (and carriers) as possible into an enclosure, and to minimize the number of "rack units" (units of vertical spacing of 1.75 inches) taken up by the enclosure. This makes the front-panel area of the enclosure (chiefly the bezel and handle portions) valuable and scarce. Some prior-art locking arrangements have symbols indicative of the locked and unlocked conditions, which take up valuable space and may not be easy to distinguish in suboptimal viewing conditions.

Experience shows that damage can occur to a carrier, to the enclosure, or to both, in instances in which a user tries to remove a carrier that is locked. Under the best of circumstances it may not be easy to distinguish between the locked and unlocked configurations of a carrier. Some rack-mounted systems, however, are behind perforated doors, Lexan doors, or other obstructions. Some prior-art mechanisms which are intended to provide an indication of the locked or unlocked status of a carrier are mechanically complicated, do not provide unambiguous indications, or have features which take up valuable space in the bezel/handle assembly.

It is thus desirable to have a locking mechanism and related system which is mechanically simple, which provides unambiguous indication of the locked or unlocked status of each carrier, and which do not take up valuable space in the bezel/handle assembly.

SUMMARY OF THE INVENTION

In a disk drive enclosure system having carriers fitting into slots in the enclosure, each carrier has a lock mechanism. The lock mechanism has a part which rotates between locked and unlocked positions, and the part has a feature that blocks removal of the carrier when the part is in the locked position, while permitting removal of the carrier when the part is in the unlocked position. The part is plastic and is molded of a clear material serving as a light pipe. A light source is behind the part, so that the ability of light to pass through the part is affected by the locked/unlocked position of the part. The part has a shape feature that assists a user in distinguishing between locked and unlocked positions, and the light indicator further assists the user in this way. Valuable bezel space is saved, especially in comparison with some prior-art locking mechanisms.

DESCRIPTION OF THE DRAWINGS

The invention will be described with respect to a drawing in several figures, of which:

FIG. 1b is a more detailed view of a portion of the carrier of FIG. 1a;

FIG. 2b is a more detailed view of a portion of the carrier of FIG. 2a;

DETAILED DESCRIPTION

Figure 1A:
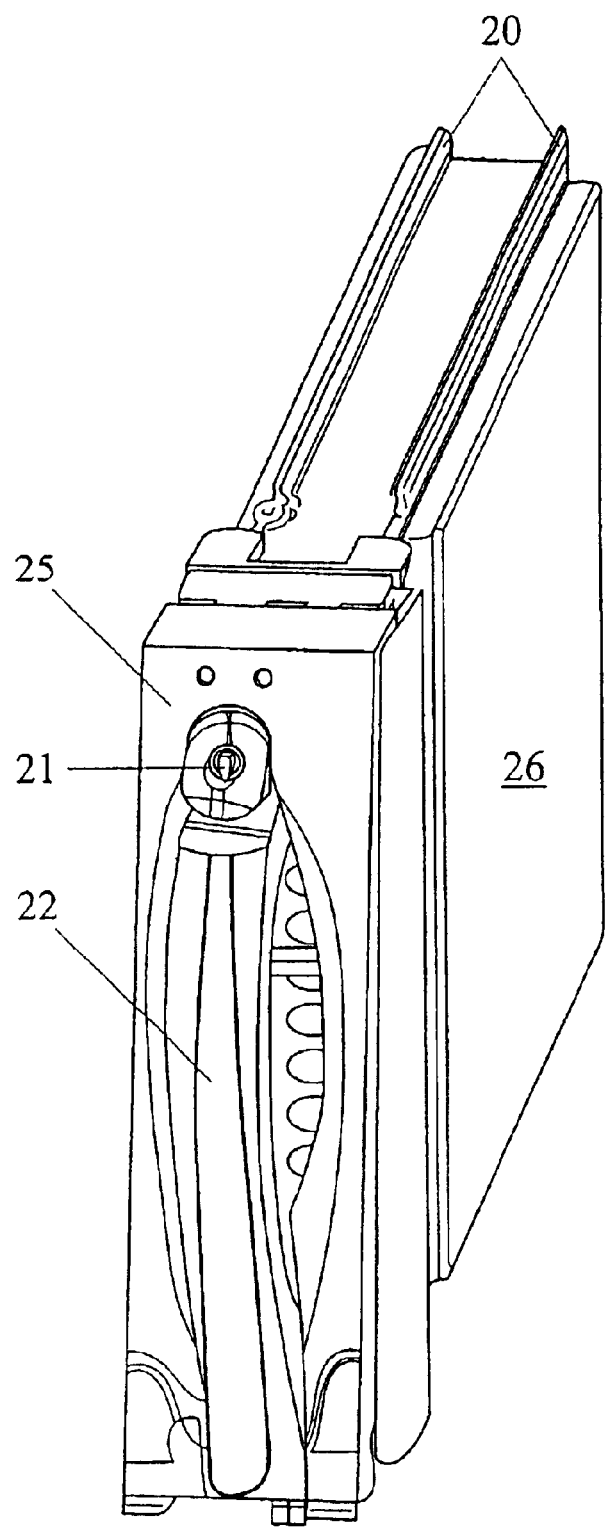
FIG. 1a is a perspective view of a disk drive carrier according to a first embodiment of the invention, showing the carrier in an unlocked configuration.

In an exemplary embodiment, the enclosure is cast from top and bottom pieces of a magnesium alloy as described in PCT publication number WO 01/72173, assigned to the same assignee as the assignee of the present invention, and incorporated herein by reference. The guides defining slots may have wedges formed therein as described in PCT publication number WO 01/73790, assigned to the same assignee as the assignee of the present invention, and incorporated herein by reference. FIG. 1a shows a typical disk drive carrier 26 in perspective view. The carrier 26 slides into the enclosure on guides 20, leaving only the bezel/handle assembly (at the front of FIG. 1a) visible after insertion. Handle 22 may be seen, as well as a lock/unlock indicator 21 about which more will be said below. Bezel 25 may also be seen.

Figure 1B:
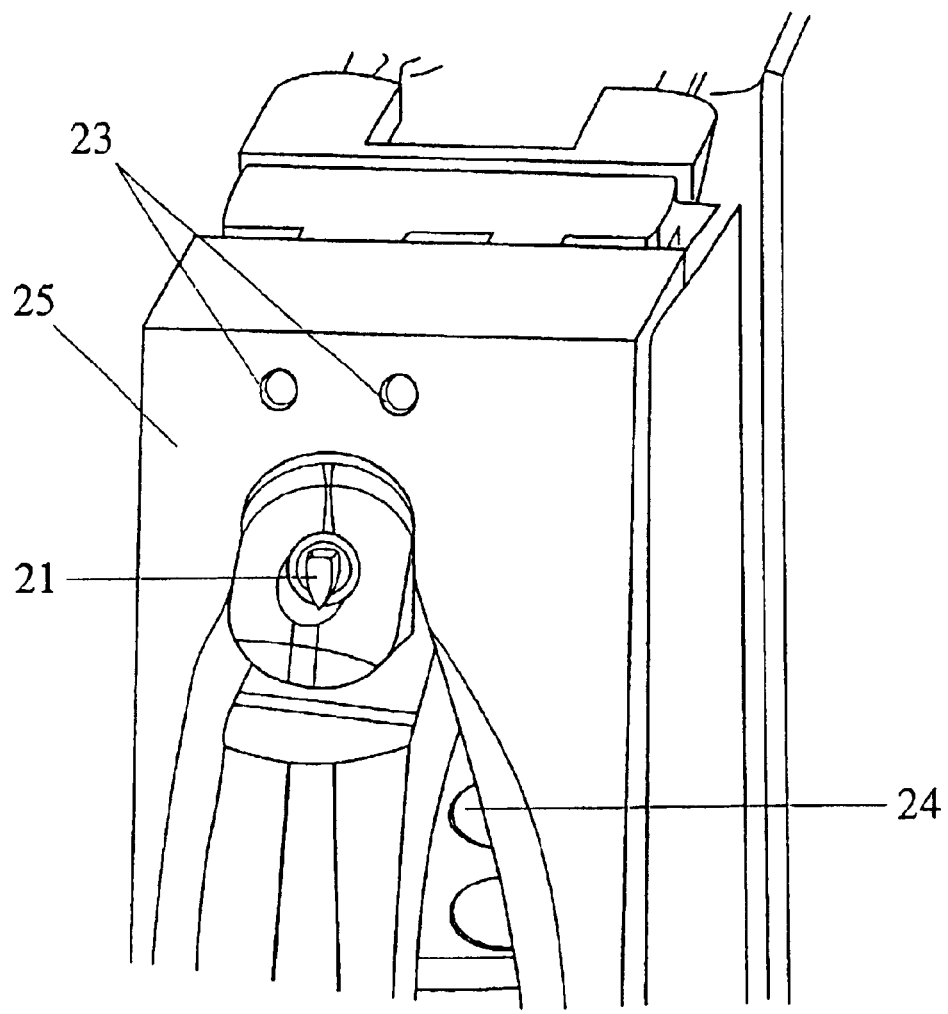

FIG. 1b shows the carrier of FIG. 1a in more detail. Optional ventilation holes 24 may be provided so that a positive or negative pressure within the enclosure draws air out of or into the holes 24 to assist in cooling the disk drive within the carrier. Optional lights 23 may indicate disk drive activity or other helpful information. Indicator 21 is more clearly visible in this view; its vertical orientation is indicative of the unlocked condition.

Figure 7A:
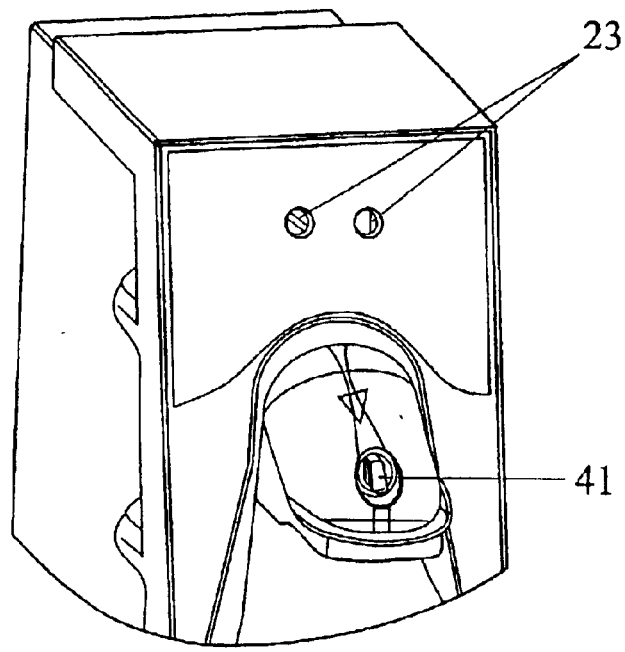
FIG. 7a is a detailed perspective view of a carrier according to the first embodiment of the invention, showing the carrier in an unlocked configuration.

FIG. 7a shows a visual variant of the arrangement of FIG. 1b, having indicator 41 showing an unlocked condition.

Figure 2A:
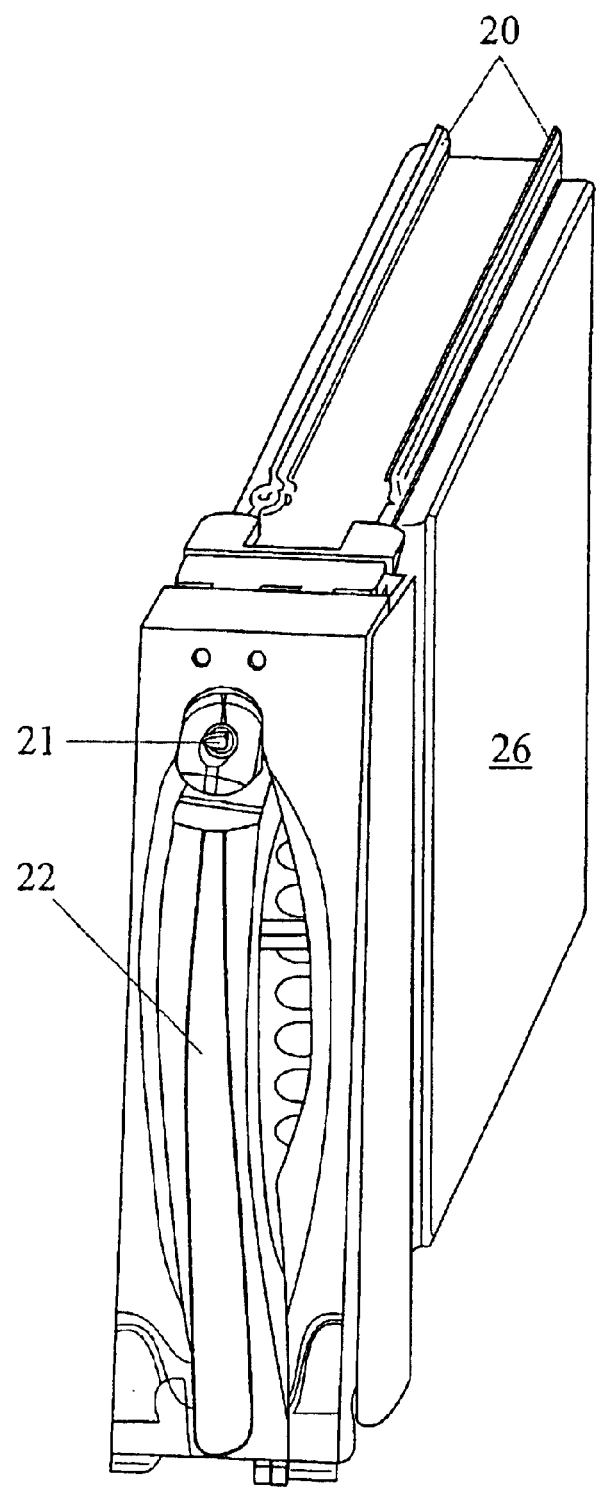
FIG. 2a is the carrier of FIG. 1a, but shown in a locked configuration, with an illuminated indicator.
Figure 2B:
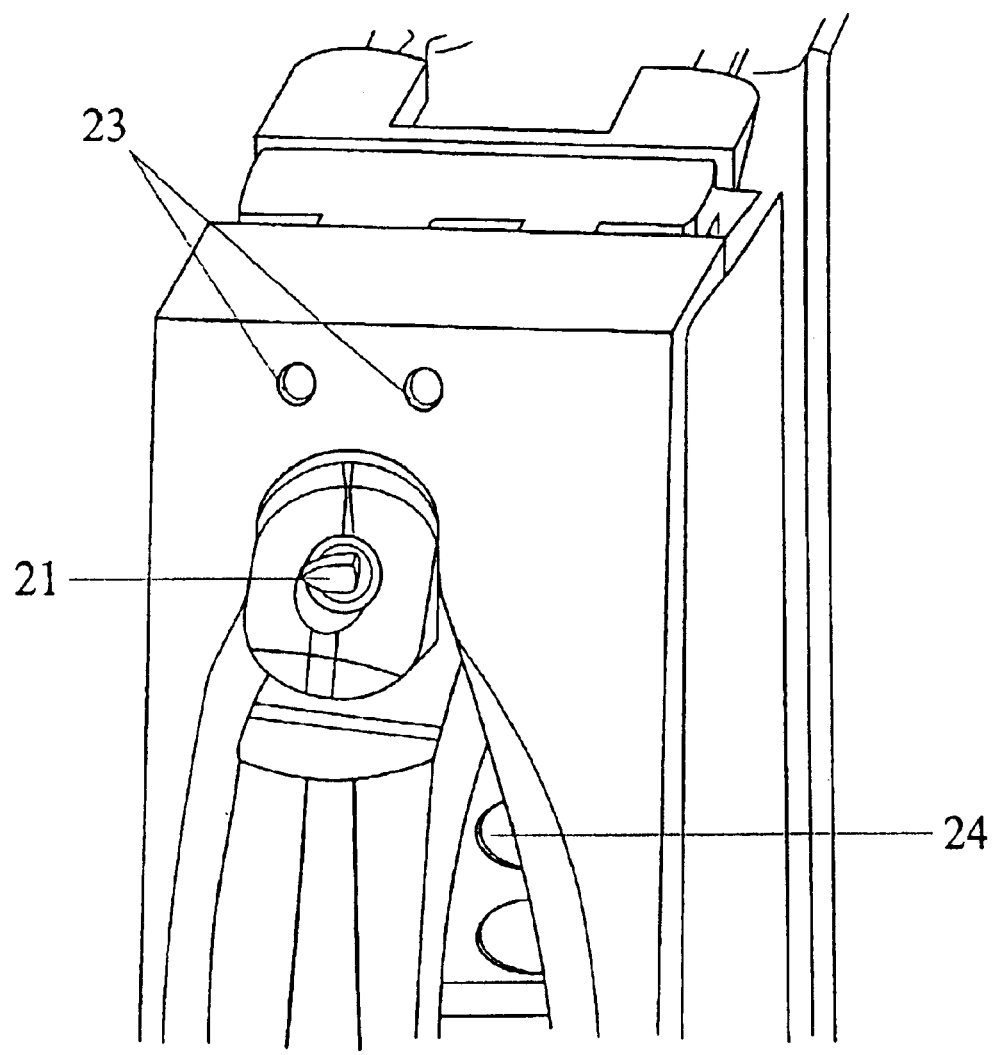
Figure 7B:
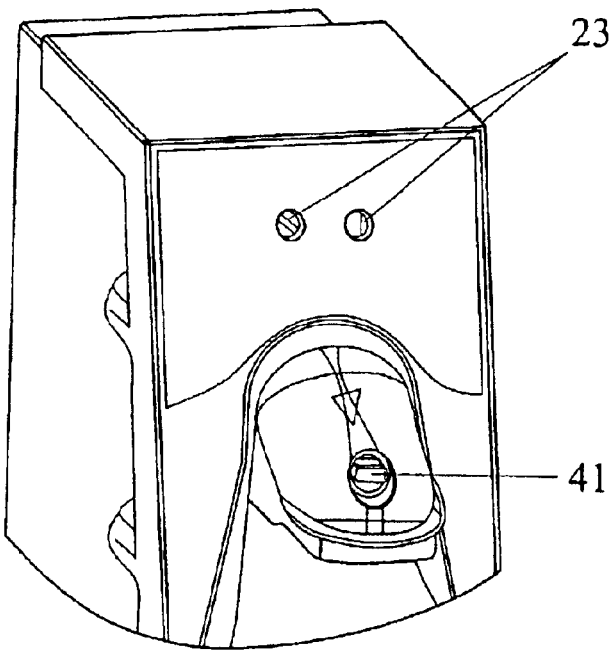
FIG. 7b is the carrier of FIG. 7a, but in a locked configuration.

Turning now to FIG. 2a, what may be seen is the carrier of FIG. 1a, but in a locked condition. FIG. 2b shows the indicator 21 in a locked position. In a typical arrangement the indicator will be internally illuminated, for example in red, indicative of the locked condition. FIG. 7b shows a visual variant of the arrangement of FIG. 2b, again having indicator 41 showing a locked condition.

Figure 3A:
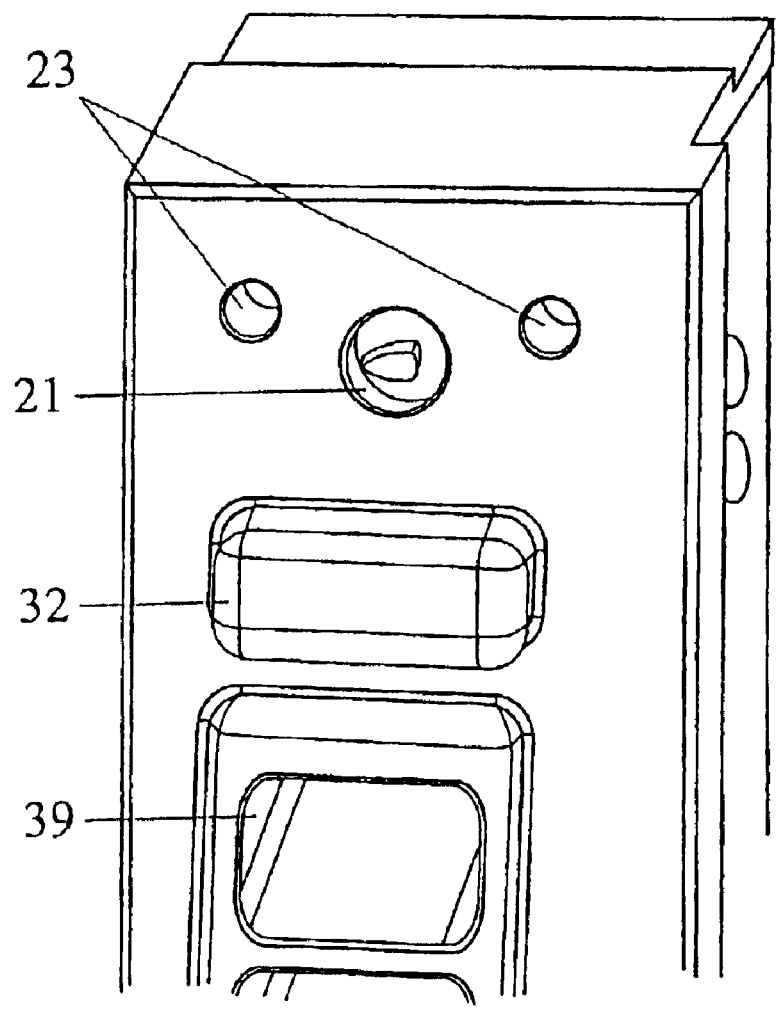
FIG. 3a is a detailed perspective view of a disk drive carrier according to a second embodiment of the invention, showing the carrier in a locked configuration.
Figure 3B:
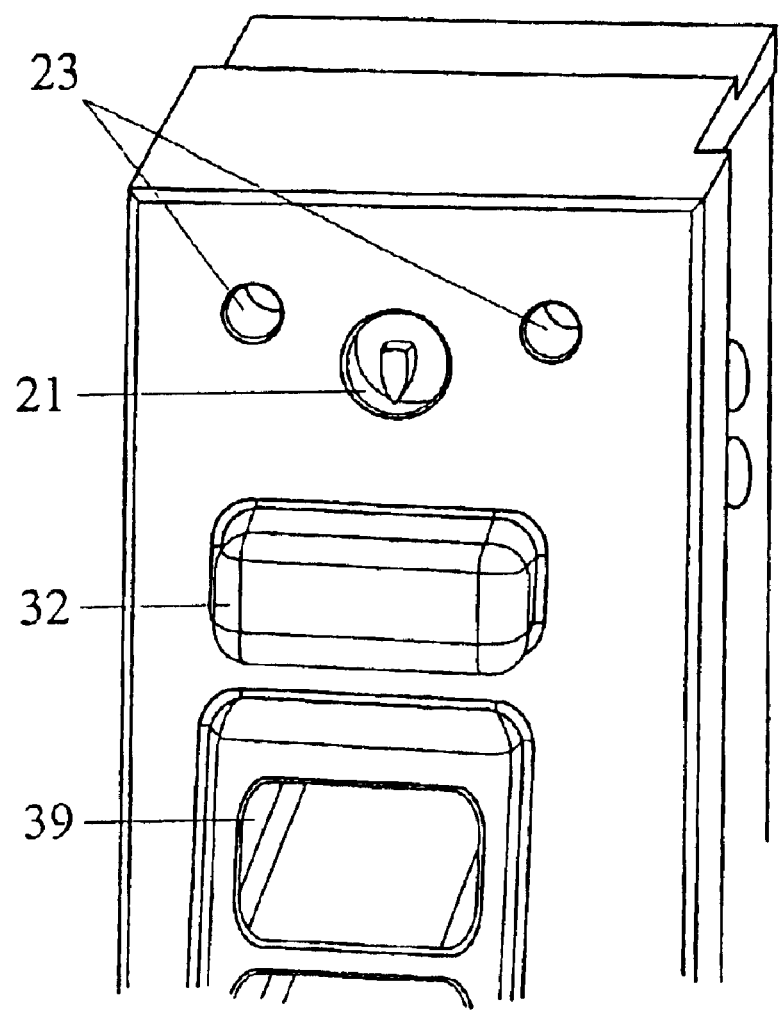
FIG. 3b is the carrier of FIG. 3a, but shown in an unlocked configuration, with an illuminated indicator.

A second embodiment of the invention will now be discussed. In this embodiment there is an indicator 21, shown in FIG. 3b, indicative of an unlocked condition. Optionally there is a release button 32 which may be pressed to eject a handle 39 which is then used to extract the carrier. If on the other hand, the indicator 21 is indicative of a locked condition, as shown in FIG. 3a, then it is not possible to remove the carrier. For example the locked condition may make it impossible to press the button 32, or impossible to operate the handle 39, or both. In a typical arrangement, the indicator 21 will be illuminated to indicate the unlocked position, for example with green light.

Figure 5A:
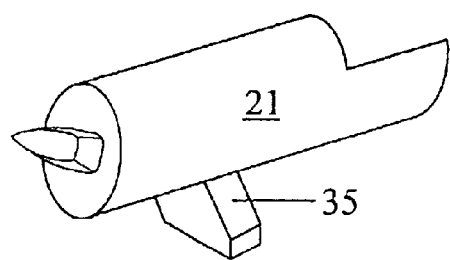
FIG. 5a shows in front perspective view the moving part of a lock mechanism according to the second embodiment of the invention, in a locked configuration.
Figure 5C:
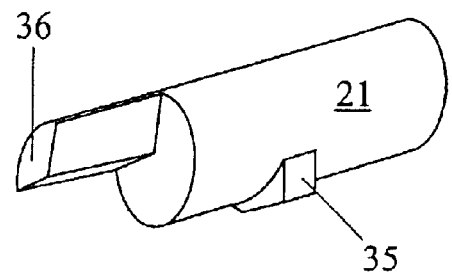
FIG. 5c is the part of FIG. 5a, but in rear perspective view.
Figure 5B:
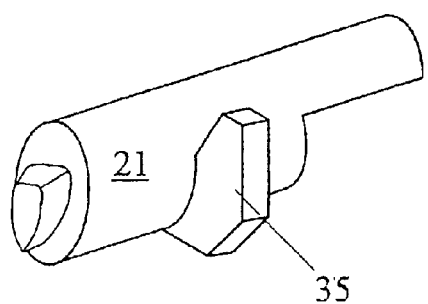
FIG. 5b shows in front perspective view the moving part of the lock mechanism of FIG. 5a in an unlocked configuration.
Figure 5D:
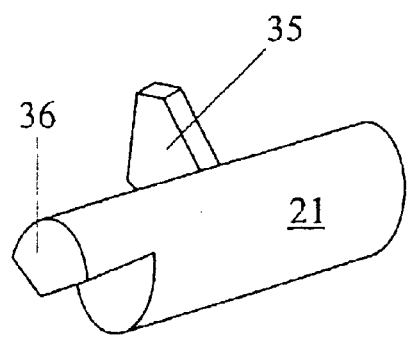
FIG. 5d is the part of FIG. 5b, but in rear perspective view.

The indicator 21 may be seen in isolated perspective view in FIG. 5a. A feature 35 locks the carrier, for example by engaging with button 32 or handle 39 as previously mentioned. If the indicator 21 is rotated about a quarter of a turn, as shown in FIG. 5b, then the feature 35 no longer engages the button 32 or handle 39. FIGS. 5c and 5d show the rear of the part 21 in locked and unlocked configurations respectively. A rearmost feature 36 of the part 21 provides a light transmitting face which selectively lines up with a light source, omitted for clarity in FIGS. 5c and 5d. The light source is preferably a light-emitting diode. For example the light source may be positioned to be juxtaposed with feature 36 when the part 21 is in the unlocked position, that is, in the position of FIG. 5d.

Figure 4A:
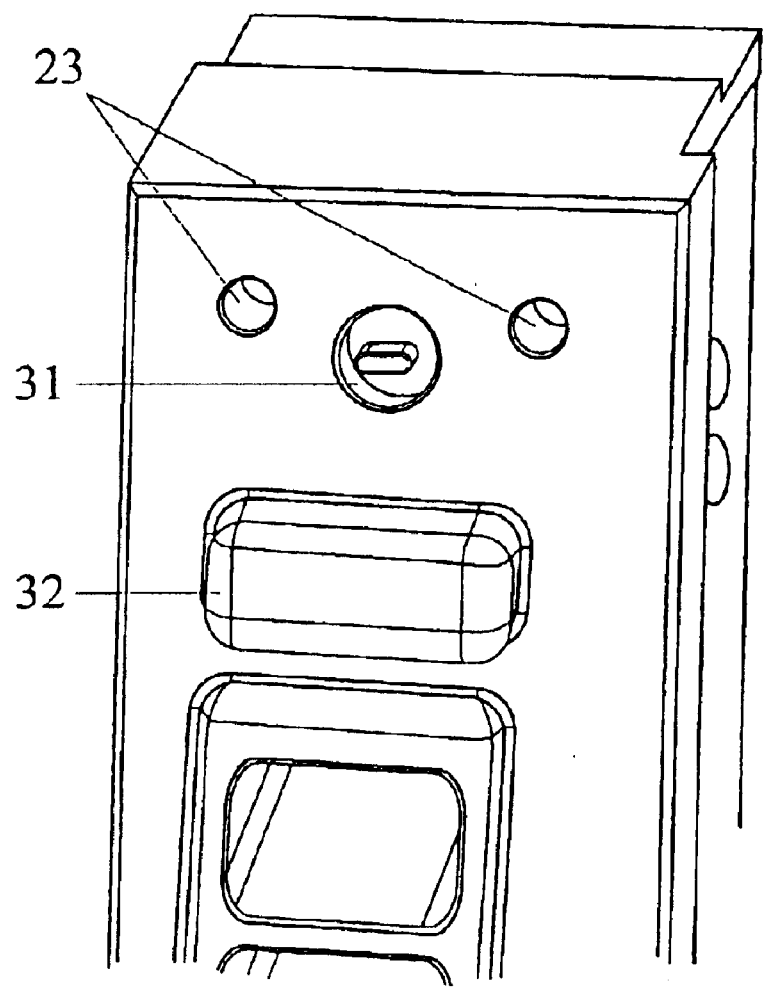
FIG. 4a is a detailed perspective view of a disk drive carrier according to a third embodiment of the invention, showing the carrier in a locked configuration.
Figure 4B:
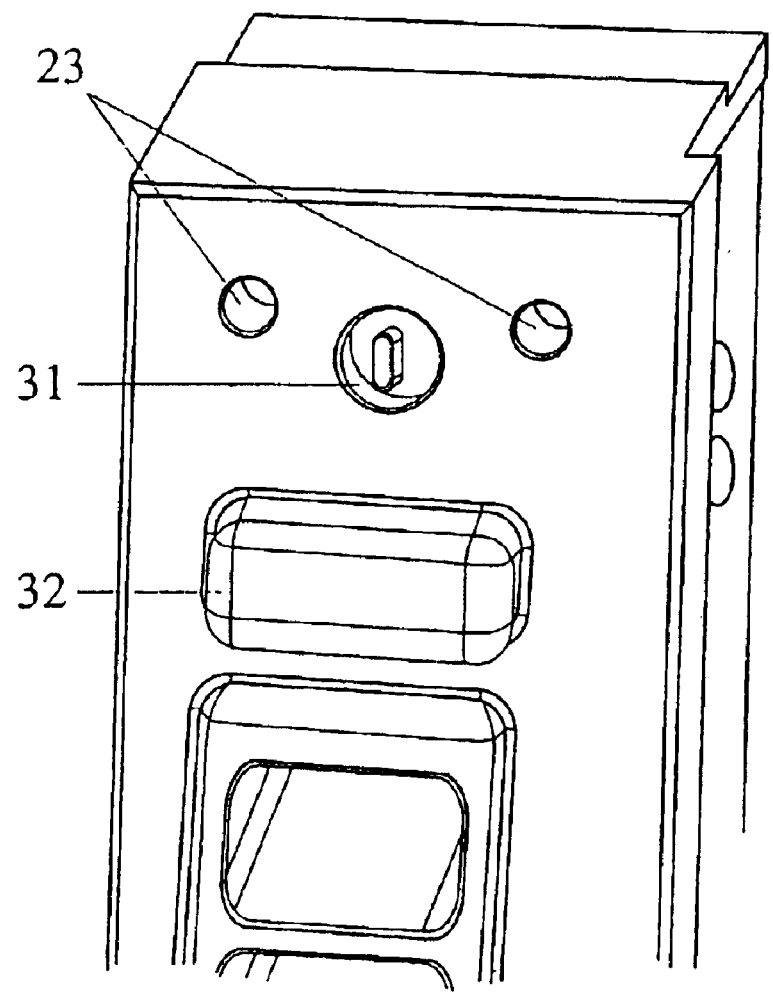
FIG. 4b is the carrier of FIG. 4a, but shown in an unlocked configuration, with an illuminated indicator.
Figure 6A:
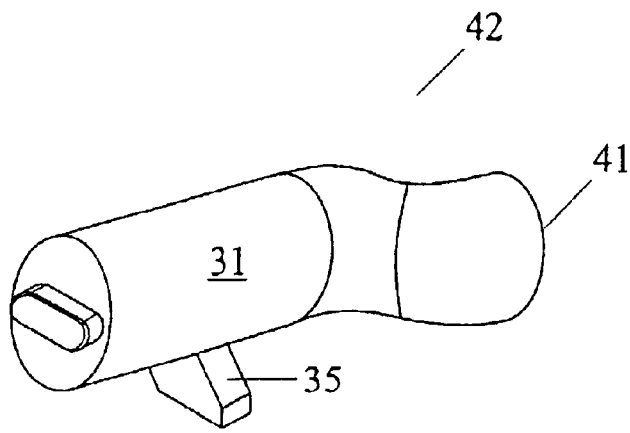
FIG. 6a shows in front perspective view the moving part of a lock mechanism according to the third embodiment of the invention, in a locked configuration.
Figure 6C:
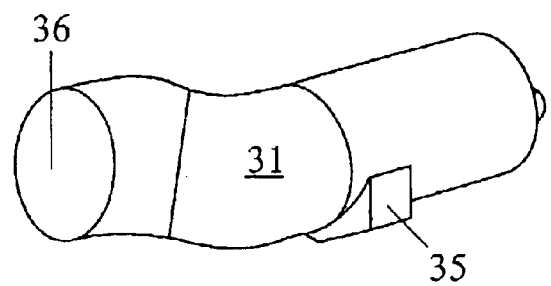
FIG. 6c is the part of FIG. 6a, but in rear perspective view.
Figure 6B:
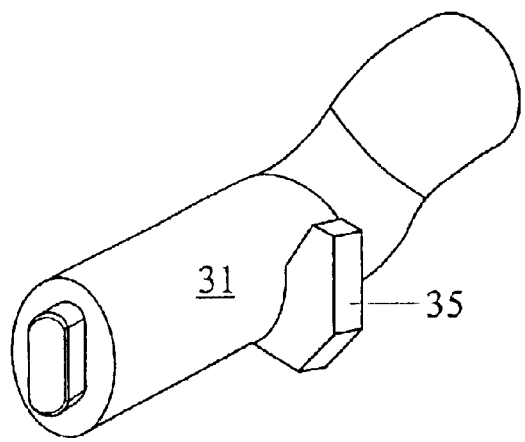
FIG. 6b shows in front perspective view the moving part of the lock mechanism of FIG. 6a in an unlocked configuration.
Figure 6D:
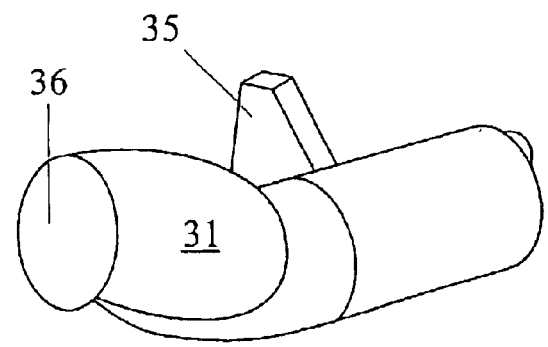
FIG. 6d is the part of FIG. 6b, but in rear perspective view.

A third embodiment is shown in FIG. 4b. Indicator 31 is vertical, indicating an unlocked position. If the indicator is rotated about a quarter of a turn, as shown in FIG. 4a, then the carrier is locked. FIGS. 6a and 6b show the part 31 in isolated perspective view. Again, feature 35 engages other parts (omitted for clarity in FIG. 6a) which lock the carrier into the enclosure. Two positions 41, 42 are shown where light sources may be located. Light source 41 lights up the part 31 when it is locked, while light source 42 lights up the part 31 when it is unlocked. FIGS. 6c and 6d show the part 31 in rear perspective isolated view, and feature 36 is a face which is juxtaposed with a light source at position 41 or 42. The light source at 41 may be no light, while the light source at 42 may be red light, indicating a locked condition. Alternatively, the light source at 41 may be a green light indicative of an unlocked condition.

It will be appreciated, then, that what has been disclosed is a lock mechanism that is an integral part of a disk drive carrier bezel/handle assembly. The lock mechanism keying feature protrudes (male). A user may use a key to turn the lock mechanism, the key being indented with the negative (female) pattern matching the lock mechanism keying feature. In keeping with the invention, two salient features are provided.

First, the lock mechanism keying feature is shaped to resemble a pointer such as an arrow. This pointer, visible from the front of the carrier, points toward one of two symbols (also integral to the carrier bezel/handle assembly) or in a direction which provides an obvious indication to the user that the mechanism is locked or unlocked.

Second, the lock mechanism is plastic, molded of a clear material and designed to act as a light pipe. The rear of the lock mechanism light pipe allows light from an LED (light emitting diode) to pass through in either the locked or unlocked position Thus, from the front of the carrier, the user will see the lock pointer is "on" when the carrier is locked for example. As will be appreciated the light can be any color and instead of showing an on/off condition, can show red/green. In this way, symbols indicative of locked and unlocked conditions may be eliminated, which frees up valuable space in the bezel area.

Those skilled in the art can readily devise myriad obvious variants and improvements, all of which are included within the scope of the claims which follow.

What is claimed is:

1. A disk drive carrier system comprising a plurality of disk drive carriers and a shelf, the shelf defining a plurality of parallel slots shaped to receive the disk driver carriers, each disk drive carrier carrying a disk drive and having a first electrical connector on a first edge of the carrier, said first edge defining an insertion direction for insertion of the carrier into the shelf, the shelf further comprising a plurality of second electrical connectors each disposed to mate with the first electrical connector of a carrier, each disk drive carrier having a first locking part movable between a first position and a second position; the system further comprising a plurality of second locking features each disposed to engage with the first locking part of a carrier if in said first position;

each said carrier further comprising a bezel visible when the first electrical connector of said carrier is mated with said second electrical connector, said bezel defining an opening, each said carrier further comprising the first locking part rotatable about an axis between said first and second positions, said first locking part being non-opaque, said first locking part rotation axis being parallel with said insertion direction, a portion of said first locking part visible through said opening, the visible portion of the first locking part shaped to present different appearances when in said first and second positions;

each said carrier further comprising a first light source positioned with respect to a feature of the first locking part such that said first light source is juxtaposed with said feature in one of said first and second positions but not in another of said first and second positions, whereby when the first light source is juxtaposed, light from the first light source is emitted from the visible portion of the first locking part.

2. The system of claim 1 further comprising a second light source positioned with respect to the feature of the first locking part such that said second light source is juxtaposed with said feature in the other of said first and second positions but not in the one of said first and second positions, whereby when the second light source is juxtaposed, light from the second light source is emitted from the visible portion of the first locking part.

3. The system of claim 1 wherein the first locking part rotates through substantially ninety degrees.

4. The system of claim 1 wherein the first locking part is transparent.

5. The system of claim 1 wherein the first locking part is translucent.

6. A method for use with a disk drive carrier system comprising a plurality of disk drive carriers and a shelf, the shelf defining a plurality of parallel slots shaped to receive the disk driver carriers, each disk drive carrier carrying a disk drive and having a first electrical connector on a first edge of the carrier, said first edge defining an insertion direction for insertion of the carrier into the shelf, the shelf further comprising a plurality of second electrical connectors each disposed to mate with the first electrical connector of a carrier, each disk drive carrier having a first locking part movable between a first position and a second position; the system further comprising a plurality of second locking features each disposed to engage with the first locking part of a carrier if in said first position; each said carrier further comprising a bezel visible when the first electrical connector of said carrier is mated with said second electrical connector, said bezel defining an opening, each said carrier further comprising the first locking part rotatable about an axis between said first and second positions, said first locking part being non-opaque, said first locking part rotation axis being parallel with said insertion direction, a portion of said first locking part visible through said opening, the visible portion of the first locking part shaped to present different appearances when in said first and second positions; each said carrier further comprising a first light source positioned with respect to a feature of the first locking part such that said first light source is juxtaposed with said feature in one of said first and second positions but not in another of said first and second positions, whereby when the first light source is juxtaposed, light from the first light source is emitted from the visible portion of the first locking part; the method comprising the steps of:
rotating the first locking part of a carrier from the first position to the second position about its axis; and
removing the carrier from a respective slot of the shelf along the insertion direction.

7. The method of claim 6 further comprising the steps of:
inserting a carrier into the respective slot of the shelf alone the insertion direction; and
rotating the first locking part of the carrier about its axis from the second position to the first position.

8. A method for use with a disk drive carrier system comprising a plurality of disk drive carriers and a shelf, the shelf defining a plurality of parallel slots shaped to receive the disk driver carriers, each disk drive carrier carrying a disk drive and having a first electrical connector on a first edge of the carrier, said first edge defining an insertion direction for insertion of the carrier into the shelf, the shelf further comprising a plurality of second electrical connectors each disposed to mate with the first electrical connector of a carrier, each disk drive carrier having a first locking part movable between a first position and a second position; the system further comprising a plurality of second locking features each disposed to engage with the first locking part of a carrier if in said first position; each said carrier further comprising a bezel visible when the first electrical connector of said carrier is mated with said second electrical connector, said bezel defining an opening, each said carrier further comprising the first locking part rotatable about an axis between said first and second positions, said first locking part being non-opaque, said first locking part rotation axis being parallel with said insertion direction, a portion of said first locking part visible through said opening, the visible portion of the first locking part shaped to present different appearances when in said first and second positions; each said carrier further comprising a first light source positioned with respect to a feature of the first locking part such that said first light source is juxtaposed with said feature in one of said first and second positions but not in another of said first and second positions, whereby when the first light source is juxtaposed, light from the first light source is emitted from the visible portion of the first locking part; the method comprising the steps of:
inserting a carrier into a respective slot of the shelf along the insertion direction; and
rotating the first locking part of the carrier about its axis from the second position to the first position.

9. The method of claim 8 further comprising the steps of:
rotating the first locking part of the carrier about its axis from the first position to the second position; and
removing the carrier from the respective slot of the shelf along the insertion direction.

10. A disk drive carrier system comprising a plurality of disk drive carriers and a shelf, the shelf defining a plurality of parallel slots shaped to receive the disk driver carriers, each disk drive carrier carrying a disk drive and having a first electrical connector on a first edge of the carrier, said first edge defining an insertion direction for insertion of the carrier into the shelf, the shelf further comprising a plurality of second electrical connectors each disposed to mate with the first electrical connector of a carrier, each disk drive carrier having a first locking part movable between a first position and a second position; the system further comprising a plurality of second locking features each disposed to engage with the first locking part of a carrier if in said first position;
each said carrier further comprising a bezel visible when the first electrical connector of said carrier is mated with said second electrical connector, said bezel defining an opening, each said carrier further comprising the first locking part rotatable about an axis between said first and second positions, said first locking part being non-opaque, said first locking part rotation axis being parallel with said insertion direction, a portion of said first locking part visible through said opening, the visible portion of the first locking part shaped to present different appearances when in said first and second positions;
each locking part carrier further comprising a first light source positioned with respect to a feature of the first locking part such that said first light source is juxtaposed with said feature in one of said first and second position but not in another of said first and second positions, whereby when the first light source is juxtaposed, light from the first light source is emitted from the visible portion of the first locking part;
the system further comprising a second light source positioned with respect to the feature of the first locking part such that said second light source is juxtaposed with said feature in the other of said first and second positions but not in the one of said first and second positions, whereby when the second light source is juxtaposed, light from the second light source is emitted from the visible portion of the first locking part.

* * * * *